No. 739,826. PATENTED SEPT. 29, 1903.
S. BUTLER.
ANTISKIDDING DEVICE FOR VEHICLE WHEELS.
APPLICATION FILED APR. 18, 1903.
NO MODEL. 2 SHEETS—SHEET 1.
Fig: 1.
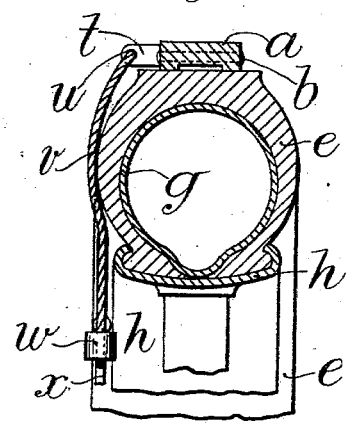
Fig: 2.
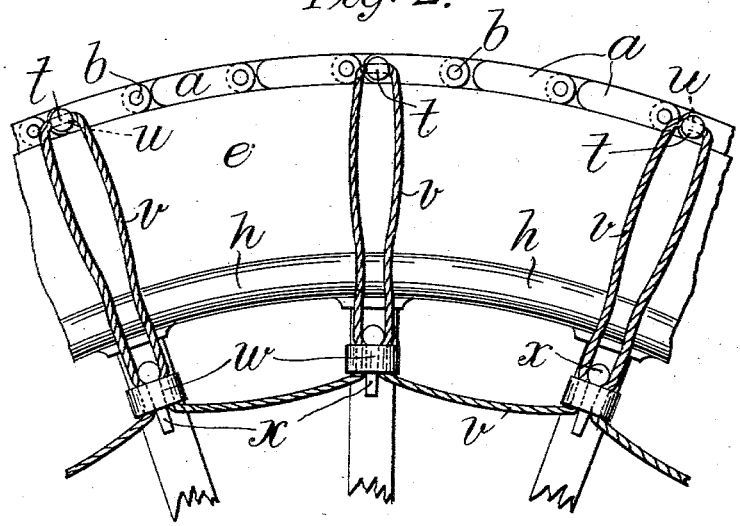

No. 739,826. PATENTED SEPT. 29, 1903.
S. BUTLER.
ANTISKIDDING DEVICE FOR VEHICLE WHEELS.
APPLICATION FILED APR. 18, 1903.
NO MODEL. 2 SHEETS—SHEET 2.
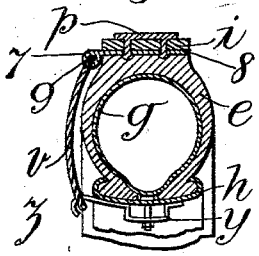
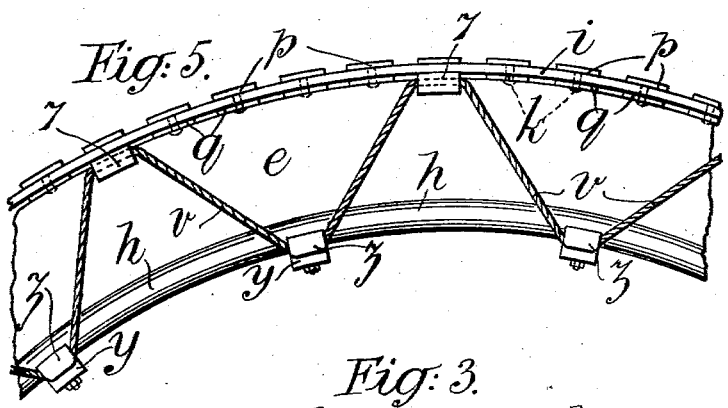
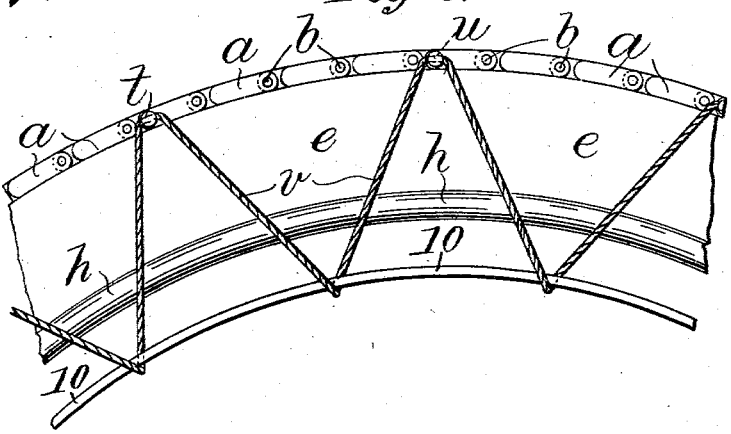

No. 739,826. Patented September 29, 1903.

UNITED STATES PATENT OFFICE.

SAMUEL BUTLER, OF WESTBURY-ON-TRYM, ENGLAND.

ANTISKIDDING DEVICE FOR VEHICLE-WHEELS.

SPECIFICATION forming part of Letters Patent No. 739,826, dated September 29, 1903.

Application filed April 18, 1903. Serial No. 153,223. (No model.)

*To all whom it may concern:*

Be it known that I, SAMUEL BUTLER, a citizen of the United Kingdom of Great Britain and Ireland, residing at Westbury-on-Trym, England, have invented certain new and useful Improvements Connected with Antiskidding Devices for Motor-Vehicles, of which the following is a specification, such as will enable others skilled in the art to which it appertains to make and use the same.

This invention has reference to and arises out of my previous invention for applying a chain-like band or belt to the tires of wheels to prevent skidding or side slipping of motorcars, cycles, and the like, for which I have applied for Letters Patent in the United States, Serial No. 153,264, of April 18, 1903.

The invention consists, first, in making a special tire with a flat face or tread having formed upon it an extra thickness of soft india-rubber over what is usual in general tire construction in order to form a bed for my chain-like band or belt to lie upon and into which it may be able to insert itself, forming its own groove or recess either by its own grip upon the tire or by the weight of the car or cycle.

Secondly, the object of my invention is to provide a means of throwing off my chain-like band or belt or other device in case of it getting slack from any cause, such as by puncture or by the leaking of a valve, and which slackness might cause skidding of the tire. There is considerable danger to the working parts of a car if the chain, belt, or other device should come off on the inner side of the wheel. I therefore provide what I call a "bridle," of rope, wire, or other suitable material, which I attach to the chain or belt at a suitable number of places, and after the chain, belt, or other device has been put on the wheel and the tire inflated, causing it to get a tight grip on the tire, I then tighten up my bridle by screws, rings, or other suitable means. I put this bridle on the outside of the wheel only, in which case should the chain or belt become slack the bridle will pull it off the tire and onto the ground, and so save damage to the tire by running upon it when deflated. The bridle will also save the chain or belt from flying into the air should any part of it break. My bridle may be formed in a number of ways; but I give herewith drawings of a few of the more simple ways in which it can be applied.

I will now describe my invention with reference to the accompanying drawings, in which—

Figure 1 shows a cross-section of a pneumatic tire *e* with a flat periphery to which my invention is applied. This tire has inner tube *g* and is mounted on rim *h* of a wheel. *a a* are the links of a chain or belt placed on the tire forming a tread for the wheel, said links being joined together by rivets or pins *b b*. *t* is a lug or projection formed on a link of the chain and having a hole *u*, through which is passed a wire rope *v*. Any suitable number of these lugs may be used. A ring *w*, having wedge or cotter *x*, embraces the two parts of the rope, which is capable of being tightened by the said ring and wedge.

Fig. 2 shows a side view of Fig. 1 and more clearly shows the cotters or wedges *x x* driven into the rings *w* to prevent the rope from becoming slack.

Fig. 3 shows a side view of a portion of a tire *e* with inner tube *g* and mounted on rim *h* of a wheel. A modified form of my invention is applied to this tire, the rings *w* and wedges *x* being dispensed with and an endless wire hoop 10 used in place thereof. A chain or belt similar to that shown in Figs. 1 and 2 is used on this tire. The rope *v* is passed alternately through the lugs *t* on the chain or belt and through the hoop, the ends of the rope being made fast by any suitable means, such as an ordinary tightening-screw. (Not shown.) Should the chain or belt come off the tire, it will fall onto the ground on the outside of the wheel, and thus be clear of the same and of the axle or driving-gear. In place of lacing the bridle in this way through an iron hoop I may use a wire-rope hoop with means of tightening it and fasten the bridle-ropes to it by clips bolted or otherwise fastened to it at the points where the rings or cotters are used in Fig. 2.

Fig. 4 shows a section of a tire *e* with another form of my invention as applied to a belt of any suitable flexible material with metal pieces or plates riveted thereto to form a tread on which the wheel runs. In this figure, *i* is a flexible belt, to which metal plates $p$ $p$ are attached by riveting to washers $q$ by rivets $k$. 7 is a lug formed on plate 8, which is substituted at intervals for the washers $q$ and in which is a hole 9 for the rope $v$. $z$ is a hook on bracket $y$, secured to the rim $h$ of the wheel.

Fig. 5 is a side view of Fig. 4 and shows part of a tire and rim of a wheel with the rope or bridle in the form of lacing passing alternately through the lugs 7 and hooks $z$.

In the case of the belt coming off it will fall clear of the hooks $z$ and will be free to fall onto the ground.

It is obvious that my bridle may be applied in many other similar ways, so that the drawings must only be taken as showing examples of its application.

What I claim, and desire to secure by Letters Patent, is—

1. In a vehicle-wheel, a tire, a chain having lugs projecting from its outer edge, a flexible connection run through the lugs, guides attached to the wheel through which the connection is passed and means for holding said connections against movement.

2. In a vehicle-wheel, a tire, a chain having lugs projecting from its outer edge, a flexible connection run through the lugs, guides attached to the wheel through which said connection is passed and means in the guides for holding the connections against movement.

3. In a vehicle-wheel, a tire, a chain having lugs projecting from its outer edge, a flexible connection run through the lugs, guides attached to the wheel through which the connection is passed and wedges in the guides frictionally engaging the connection against movement.

In witness whereof I have hereunto set my hand in presence of two witnesses.

SAMUEL BUTLER.

Witnesses:
HENRY FAIRBROTHER,
WALTER J. SKERTEN.